United States Patent
Kim et al.

(10) Patent No.: US 9,628,941 B2
(45) Date of Patent: Apr. 18, 2017

(54) MTC MONITORING METHOD

(71) Applicant: LG ELECTRONICS INC., Seoul (KR)

(72) Inventors: Laeyoung Kim, Seoul (KR); Hyunsook Kim, Seoul (KR); Jaehyun Kim, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 14/430,502

(22) PCT Filed: Aug. 22, 2013

(86) PCT No.: PCT/KR2013/007541
§ 371 (c)(1),
(2) Date: Mar. 23, 2015

(87) PCT Pub. No.: WO2014/051260
PCT Pub. Date: Apr. 3, 2014

(65) Prior Publication Data
US 2015/0249900 A1  Sep. 3, 2015

Related U.S. Application Data

(60) Provisional application No. 61/705,640, filed on Sep. 26, 2012, provisional application No. 61/706,740, (Continued)

(51) Int. Cl.
*H04W 4/00* (2009.01)
*H04W 24/10* (2009.01)
(Continued)

(52) U.S. Cl.
CPC .......... *H04W 4/005* (2013.01); *H04W 24/10* (2013.01); *H04W 76/046* (2013.01); *H04W 84/04* (2013.01); *H04W 84/042* (2013.01)

(58) Field of Classification Search
None
See application file for complete search history.

(56) References Cited

U.S. PATENT DOCUMENTS

2012/0106332 A1   5/2012   Tiwari
2012/0257571 A1*  10/2012  Liao .................. H04W 4/005
                                             370/328
(Continued)

FOREIGN PATENT DOCUMENTS

KR   10-2012-0037988   4/2012
KR   10-2012-0070438   6/2012
(Continued)

OTHER PUBLICATIONS

PCT International Application No. PCT/KR2013/007541, Written Opinion of the International Searching Authority dated Nov. 29, 2013, 1 page.

*Primary Examiner* — Min Jung
(74) *Attorney, Agent, or Firm* — Lee Hong Degerman Kang Waimey

(57) ABSTRACT

The present invention relates to a machine-type communication (MTC) monitoring method. The MTC monitoring method includes the steps of: detecting an MTC monitoring-related event while an MTC device in operation having a first priority drives a delay timer; and, when the detected event needs to be reported, transmitting a request message including a report for the detected event to a network node even when the delay timer is being driven, wherein the request message can include an indicator indicating that the request message has been transmitted due to the event detection.

13 Claims, 15 Drawing Sheets

Related U.S. Application Data filed on Sep. 27, 2012, provisional application No. 61/708,646, filed on Oct. 2, 2012, provisional application No. 61/721,456, filed on Nov. 1, 2012, provisional application No. 61/818,886, filed on May 2, 2013.

(51) Int. Cl.
*H04W 76/04* (2009.01)
*H04W 84/04* (2009.01)

(56) References Cited

U.S. PATENT DOCUMENTS

| | | | |
|---|---|---|---|
| 2013/0083653 A1* | 4/2013 | Jain | H04W 4/005 370/230 |
| 2013/0182644 A1* | 7/2013 | Kim | H04W 76/025 370/328 |
| 2013/0203399 A1* | 8/2013 | Gupta | H04W 28/12 455/418 |

FOREIGN PATENT DOCUMENTS

| | | |
|---|---|---|
| KR | 10-2012-0070523 | 6/2012 |
| KR | 10-1167939 | 8/2012 |

* cited by examiner

MTC MONITORING METHOD

CROSS-REFERENCE TO RELATED APPLICATIONS

This application is the National Stage filing under 35 U.S.C. 371 of International Application No. PCT/KR2013/007541, filed on Aug. 22, 2013, which claims the benefit of U.S. Provisional Application Ser. No. 61/705,640, filed on Sep. 26, 2012, 61/706,740, filed on Sep. 27, 2012, 61/708,646, filed on Oct. 2, 2012, 61/721,456, filed on Nov. 1, 2012 and 61/818,886, filed on May 2, 2013, the contents of which are all hereby incorporated by reference herein in their entirety.

BACKGROUND OF THE INVENTION

Field of the Invention

The present invention relates to a Machine Type Communication (MTC) monitoring method.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 7 shows a 3GPP service model for supporting MTC.

A Machine Type Communication (MTC) device may be used in a mobile communication system. MTC implies communication between one machine and another machine or between a machine to a server, excluding a human intervention. A device used in this case is called the MTC device, and a server used in this case is called an MTC server. A service provided through the MTC device is distinguished from a communication service based on the human intervention, and may be applied to various ranges of services.

The aforementioned MTC device is a communication device for performing communication between one machine and another machine or between a machine and a server, and is not much different from a User Equipment (UE) with a human intervention, except that the human intervention is excluded. That is, the MTC device may correspond to the UE excluding the human intervention. However, in terms of excluding the human intervention, some problems may occur if a message transmission/reception method (e.g., a paging message transmission/reception method) of the UE with the human intervention is collectively applied to the MTC device.

To support the MTC, although it is defined that communication is achieved through a PS network in GSM/UMTS/EPS of the 3GPP standard, a method applicable also to a CS network is described in the present specification.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC. It is shown in FIG. 7 that the UE used for the MTC is connected to a 3GPP network (e.g., UTRAN, E-UTRAN, GERAN, I-WLAN, etc.) through an Um/Uu/LTE-Uu interface. The architecture of FIG. 7 includes various MTC models (e.g., a direct model, an indirect model, and a hybrid model).

Entities shown in FIG. 7 are now described.

In FIG. 7, an application server is a server on a network on which an MTC application is executed. The aforementioned various techniques for implementing the MTC applications may be applied to the MTC application server, and a detailed description thereof will be omitted. In addition, in FIG. 7, the MTC application server may access the MTC server through a reference point API, and a detailed description thereof will be omitted. Alternatively, the MTC application server may be collocated with the MTC server.

The MTC server (e.g., a Services Capability Server (SCS) shown in the figure) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. To support the MTC indirect or hybrid model, one or more MTC-IWFs may exist in a Home PLMN (HPLMN). The MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, etc.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, etc., and for providing it to the MTC-IWF.

An MSC/SGSN/MME may perform a control function such as mobility management, authentication, resource allocation, etc., for network connection of the UE. Regarding triggering, a function for receiving a trigger indication from the MTC-IWF and for processing it in a form of a message provided to the MTC UE may be performed.

A GGSN (Gateway GPRS Support Node)/S-GW (Serving-Gateway)+P-GW (Packet Data Network-Gateway) may perform a function of a gateway which serves for connection of a core network and an external network.

Table 2 below is a summary of an important reference point in FIG. 7.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 7.

FIG. 8 shows an example of a service via an MTC device.

The service via the MTC device may be classified into several types. For example, there is a service for collecting a variety of information by the MTC device.

Referring to FIG. 8, as an example of the aforementioned service, it is shown that a measuring service, a road information service, a user electronic device control service, etc., can be provided via the MTC device. Herein, when the MTC device collects measuring information, road traffic information, etc., and transmits it to an eNodeB, the eNodeB may transmit it to an MTC server, and an MTC user may use a provided service.

A 3GPP service model/system for supporting MTC may provide a monitoring function/service for managing the MTC device. For example, a 3GPP system may detect the following event and report the detected event to the MTC server, so that the MTC user is allowed to easily manage the MTC device.

The MTC device performs an action inappropriate to an activated MTC feature(s).

Change in an association between the MTC device and the UICC.

The MTC device has lost a connectivity to the network. A maximum time between a time at which the connectivity is actually lost and a time at which the connectivity loss is detected is configurable in unit of subscribers.

Communication failure event and its cause.

Location change (geographical position and/or point of attachment in the network of the MTC device)

Although the MTC device can be monitored as described above, a detailed procedure and solution thereof have not been provided. In particular, there is no method of monitoring various events by the MTC device to transmit it to a network.

SUMMARY OF THE INVENTION

Accordingly, an aspect of the present invention is to provide a method of solving the above-mentioned problems.

To achieve the aforementioned purpose, the present invention is to provide a machine type communication

TABLE 2

| Reference point | Description |
| --- | --- |
| Tsms | It is the reference point used by an entity outside the 3 GPP system to communicate with UEs used for MTC through an SMS. |
| Tsp | It is the reference point used by an entity outside the 3GPP system to communicate with the MTC-IWF related control plane signalling. |
| T4 | A reference point used by the MTC-IWF to route device trigger to the SMS-SC in the HPLMN. |
| T5a | A reference point used between the MTC-IWF and the serving SGSN. |
| T5b | A reference point used between the MTC-IWF and the serving MME. |
| T5c | A reference point used between the MTC-IWF and the serving MSC. |
| S6m | A reference point used by the MTC-IWF to interrrogate the HSS/HLR for E.164 MSISDN (Mobile Station International Subscriber Directory Number) or external identifier mapping to IMSI and gather UE reachability and configuration information. |

At least one of the reference points T5a, T5b, and T5c is referred to as T5.

(MTC) monitoring method. The method may comprise: detecting, an MTC device operating with a first priority, an MTC monitoring related event during running a back-off timer; and when the detected event needs to be reported, transmitting to a network node a request message containing a report on the detected event even if the back-off timer is running. The request message includes an indicator indicating that the request message is caused by the event detection.

The request message may correspond to any one of an attach request message, a tracking area update (TAU) request message, a routing area update (RAU) request message, and a radio resource control (RRC) connection request message.

The running back-off timer may include one or more of a mobility management (MM) back-off timer, a session management (SM) back-off timer, and an extended wait timer.

The transmitting of the request message may comprise changing from the first priority to the second priority.

The first priority may be a low priority, and the second priority may be a normal priority or a priority overriding the low priority or a priority higher than the low priority.

The report may contains one or more of: a type of a detected event; a time at which the event is detected; service capability server (SCS) and/or application information related to the detected event; MTC application information related to the detected event; and additional information related to the detected event.

In the detecting of the event, it is determined that the event is detected when the MTC device moves away from an allowed location or is at a restricted location.

The location may be expressed in any one of units of a cell, a location area, a tracking area, a routing area, a PLMN, an area configured with an actual longitude/latitude, a serving node (in)capable of a location registration, and an (e)NodeB (in)capable of a camp-on operation.

The request message may be transmitted without information on the first priority.

The network node may be a mobility management entity (MME) or a serving GPRS support node (SGSN).

To achieve the aforementioned purpose, the present invention is to provide a machine type communication (MTC) monitoring method. The method may comprise: receiving a request message from an MTC device which is operating with a first priority and is running a back-off timer, wherein the request message contains an indicator indicating that the request message is caused by an event detection; determining whether to accept the request message on the basis of the indicator; and if the request message is accepted, delivering the request message to an MTC monitoring related server.

According to an aspect of the present specification, there is provided a method in which MTC-related monitoring can be performed by an MTC device and a result thereof can be correctly reported to a network. In addition, according to an aspect of the present specification, the MTC device can correctly transmit a monitoring result report even if a back-off timer (e.g., an MM back-off timer, an SM back-off timer, and an extended wait timer) are running.

DESCRIPTION OF EXEMPLARY EMBODIMENTS

Figure 1:
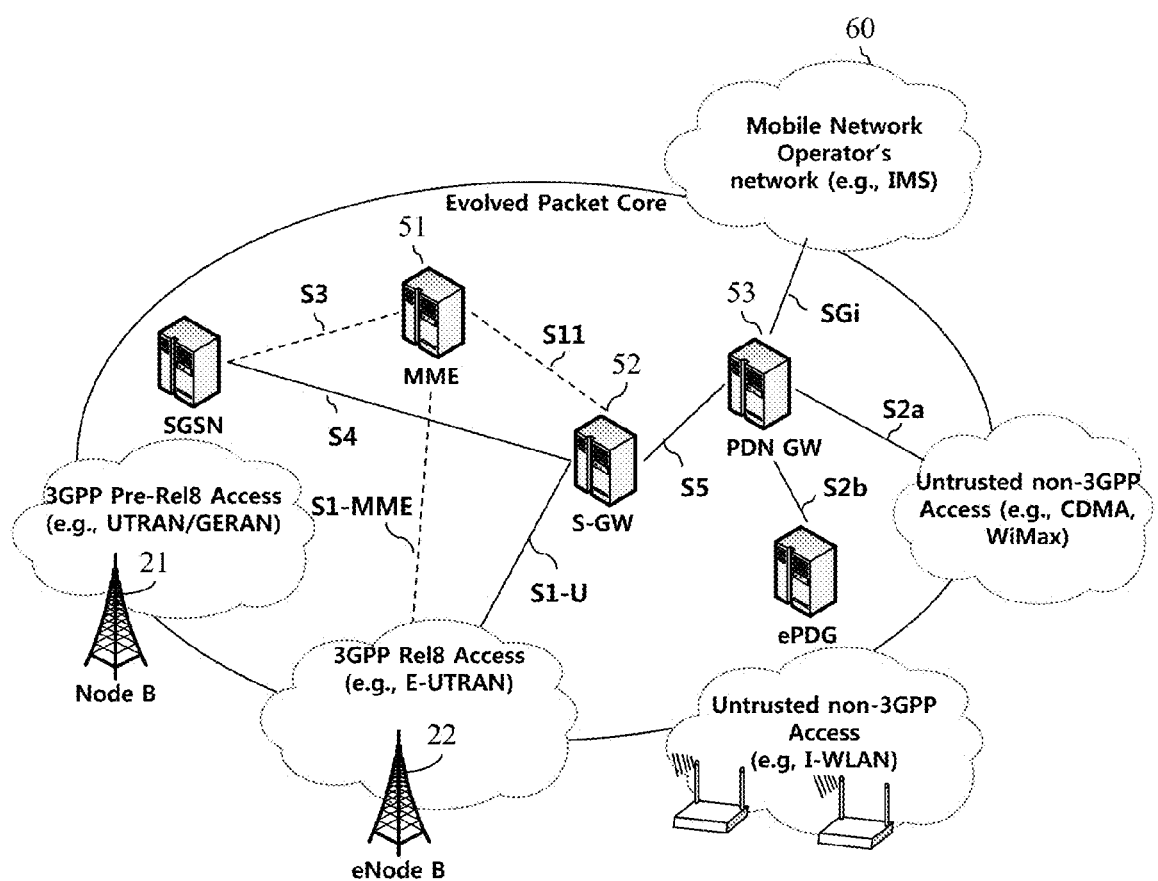
FIG. 1 shows the configuration of an evolved mobile communication network.
Figure 2:
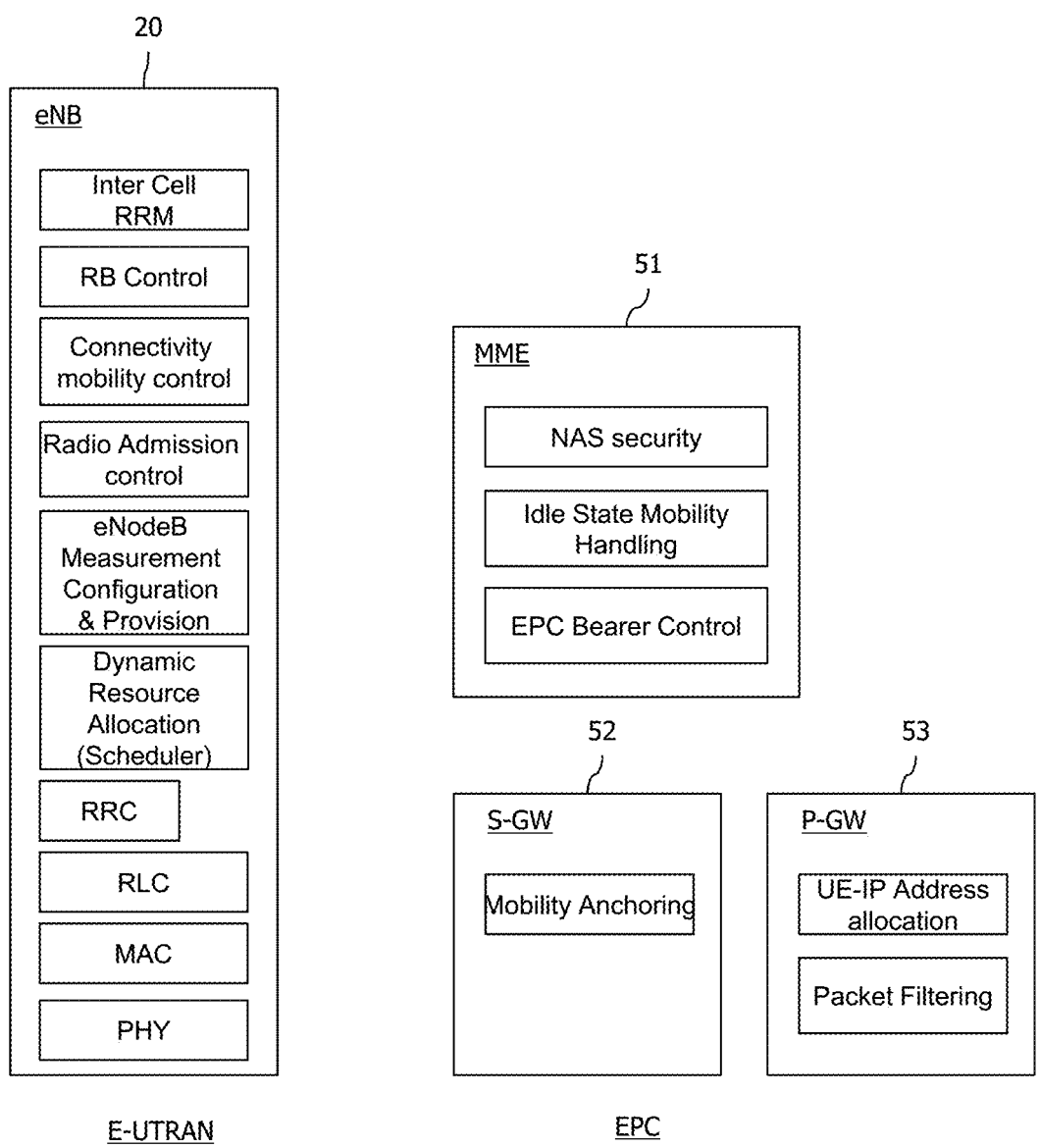
FIG. 2 is an exemplary diagram showing the architecture of a common Evolved Universal Terrestrial Radio Access Network (E-UTRAN) and a common Evolved PAcket Core (EPC).
Figure 3:
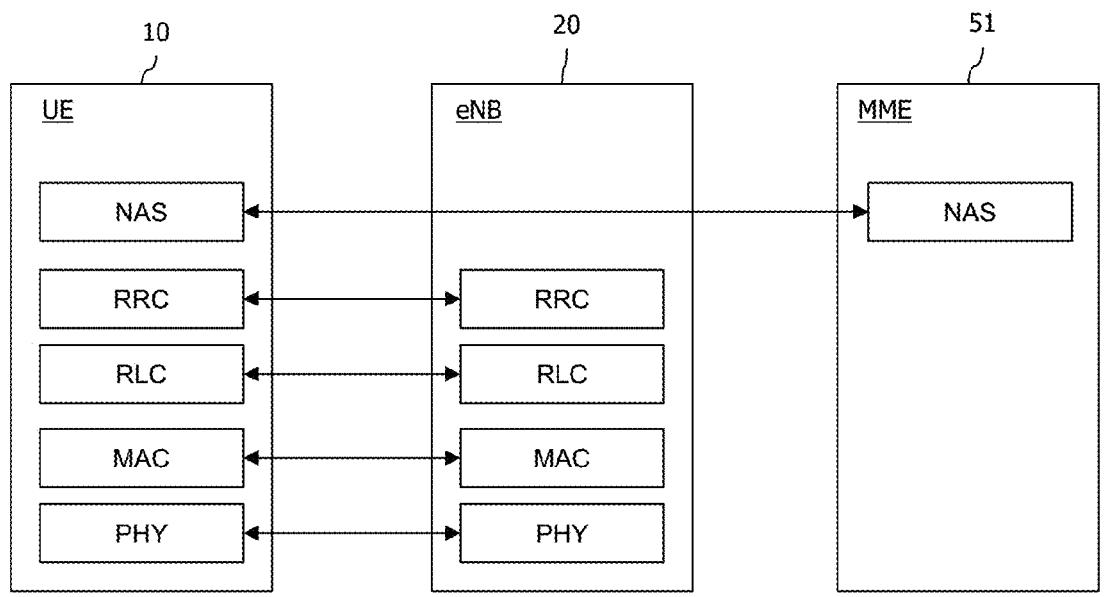
FIG. 3 is an exemplary diagram showing the structure of a radio interface protocol in a control plane between a User Equipment (UE) and an evolved NodeB (eNodeB).
Figure 4:
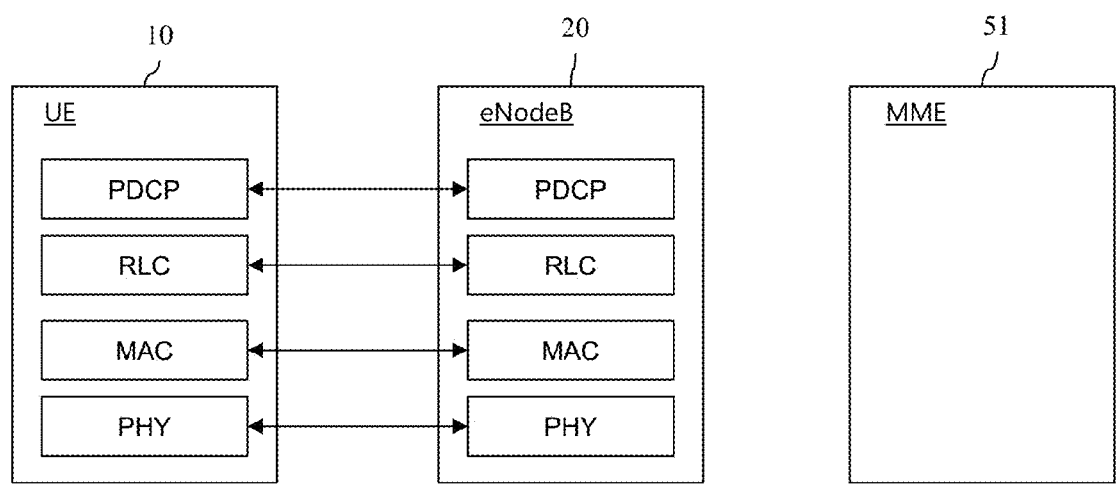
FIG. 4 is another exemplary diagram showing the structure of a radio interface protocol in a control plane between a UE and an eNodeB.
Figure 5:
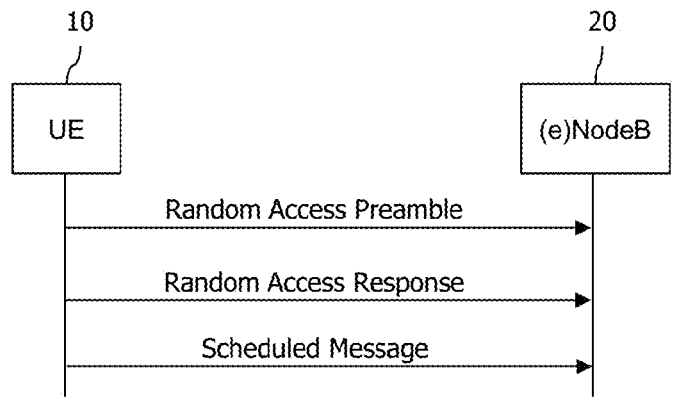
FIG. 5 is a flowchart illustrating a random access process in 3rd Generation Partnership Project (3GPP) Long Term Evolution (LTE).
Figure 6:
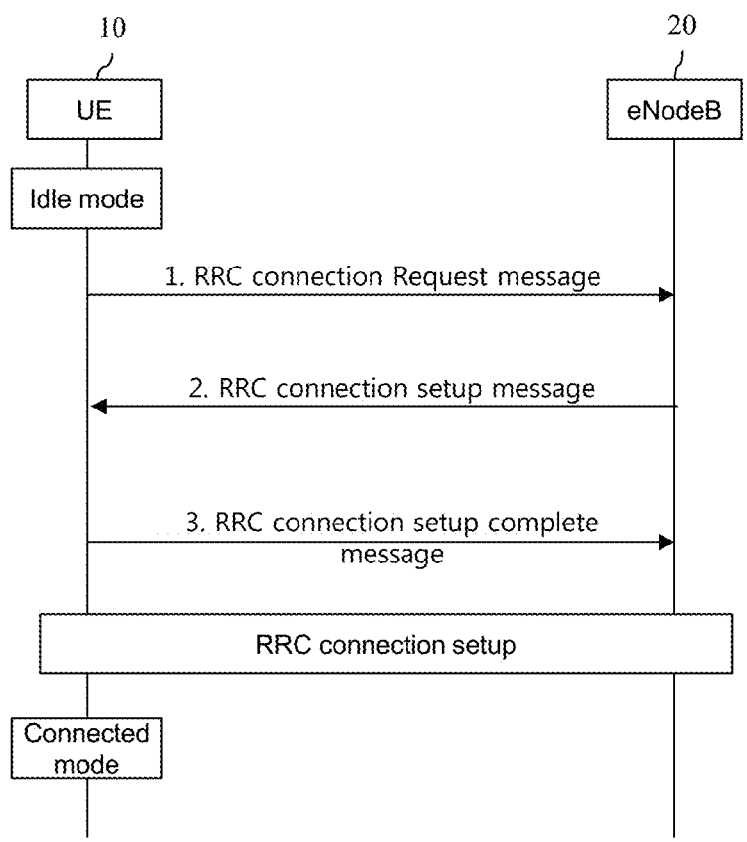
FIG. 6 shows a connection process in a Radio Resource Control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

MTC user: A user who uses a service provided by the MTC server.

NAS (Non-Access-Stratum): A higher stratum of a control plane between a UE and an MME. The NAS supports mobility management, session management, IP address management, etc., between the UE and the network MM (Mobility Management) action/procedure: An action or procedure for mobility regulation/management/control of the UE. The MM action/procedure may be interpreted as including one or more of an MM action/procedure in a CS network, a GMM action/procedure in a GPRS network, and an EMM action/procedure in an EPS network. The UE and the network node (MME, SGSN, MSC) exchange an MM message to perform the MM action/procedure.

SM (Session Management) action/procedure: An action or procedure for regulating/managing/processing/handling a user plane and/or a bearer context/PDP context of the UE. The SM action/procedure may be interpreted as including one or more of an SM action/procedure in a GPRS network and an ESM action/procedure in an EPS network. The UE and the network node (MME, SGSN) exchange an SM message to perform the SM action/procedure.

Low priority UE: A UE configured for NAS signaling low priority. The standard document 3GPP TS 24.301 and TS 24.008 may be incorporated by reference for details thereof.

Dual priority UE: A UE configured for dual priority. That is, a UE which provides dual priority support is configured for a NAS signaling low priority and also configured to override the NAS signaling low priority indicator. The standard document 3GPP TS 24.301 and TS 24.008 may be incorporated by reference for details thereof.

Hereinafter, an aspect of the present specification is described with reference to the accompanying drawings.

Figure 9:
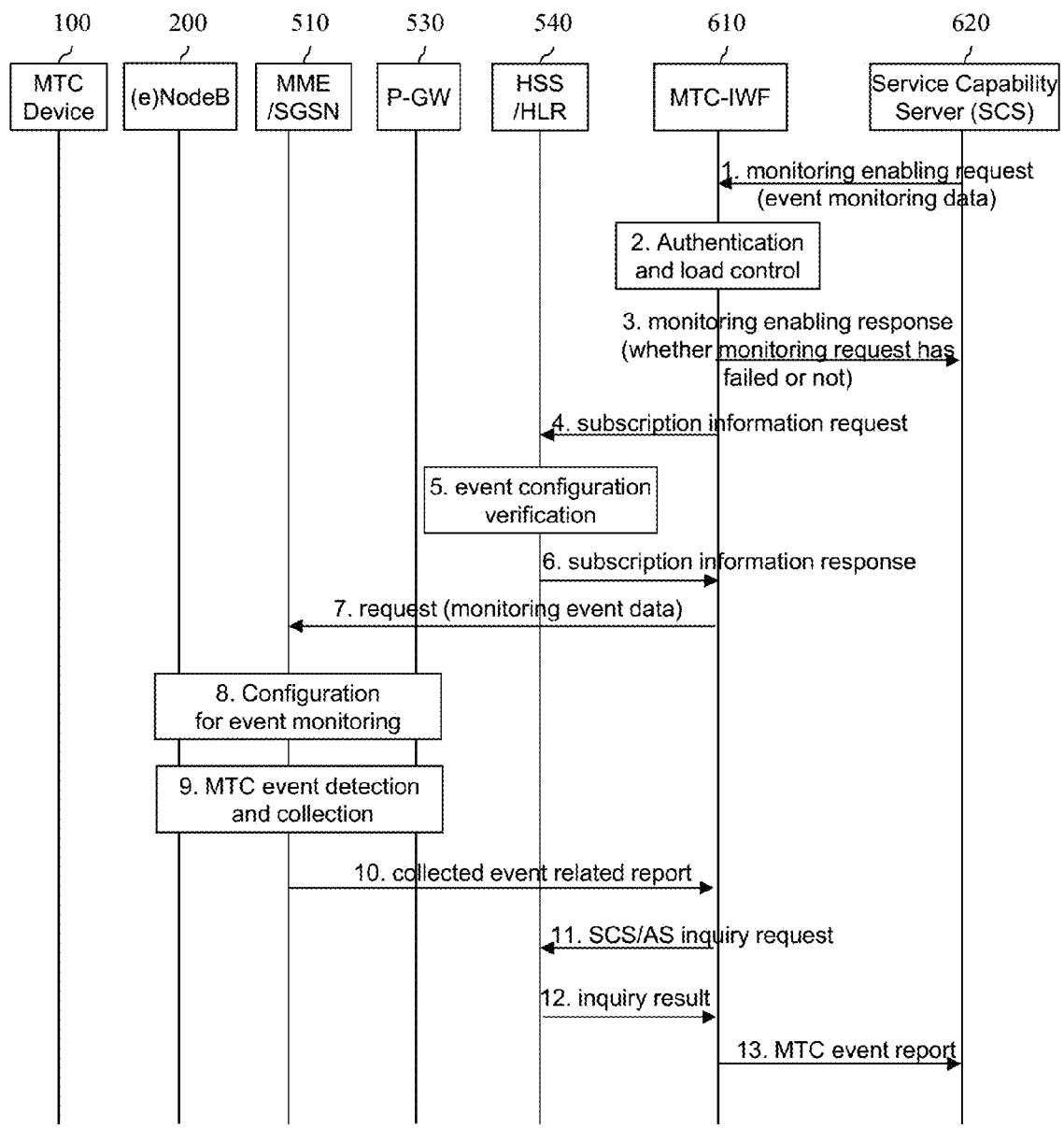
FIG. 9 is a signal flow digram showing a process of performing MTC-related monitoring by a network node.

FIG. 9 is a signal flow digram showing a process of performing MTC-related monitoring by a network node.

Referring to FIG. 9, the MTC-related monitoring may be requested to be performed by the network node. The MTC monitoring includes activating monitoring of a specific event, detecting the event, and reporting the detected event to a verified user, e.g., an application. Upon detection of the event, the network node may instruct a special action such as a specific behavior, e.g., an access restriction, an allocated resource reduction, etc.

Figure 7:
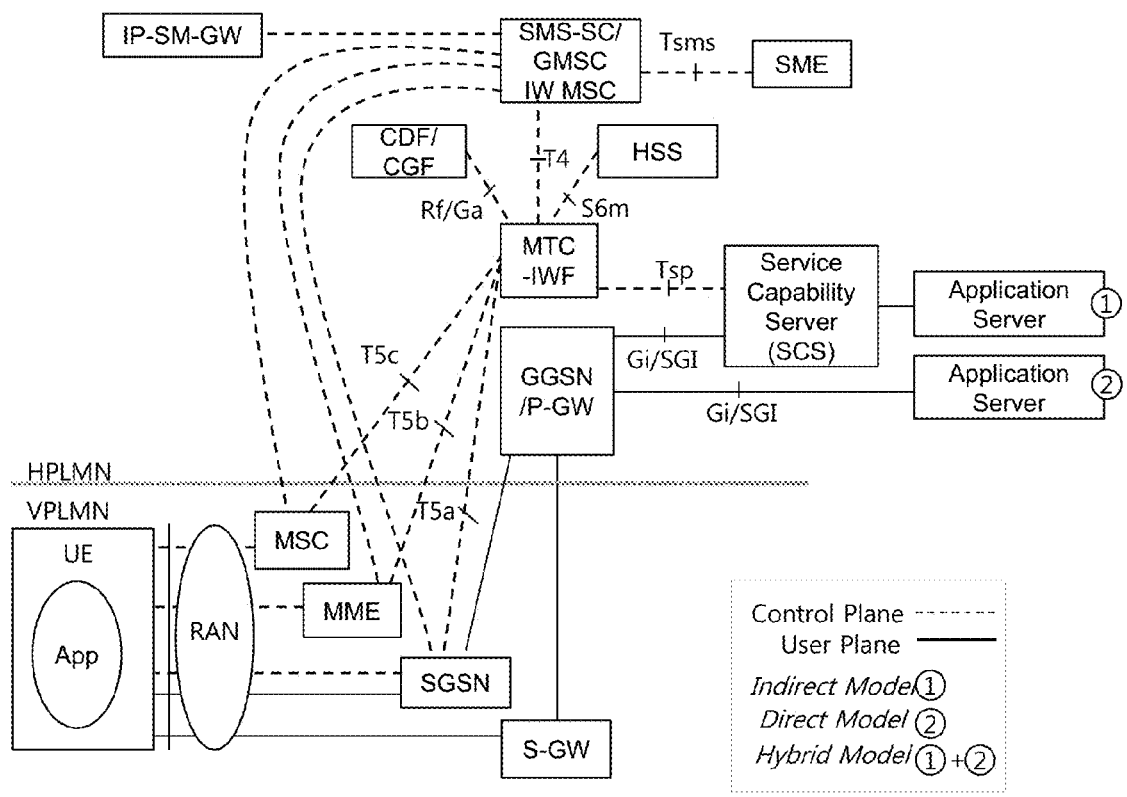
FIG. 7 shows a 3GPP service model for supporting Machine Type Communication (MTC).
Figure 8:
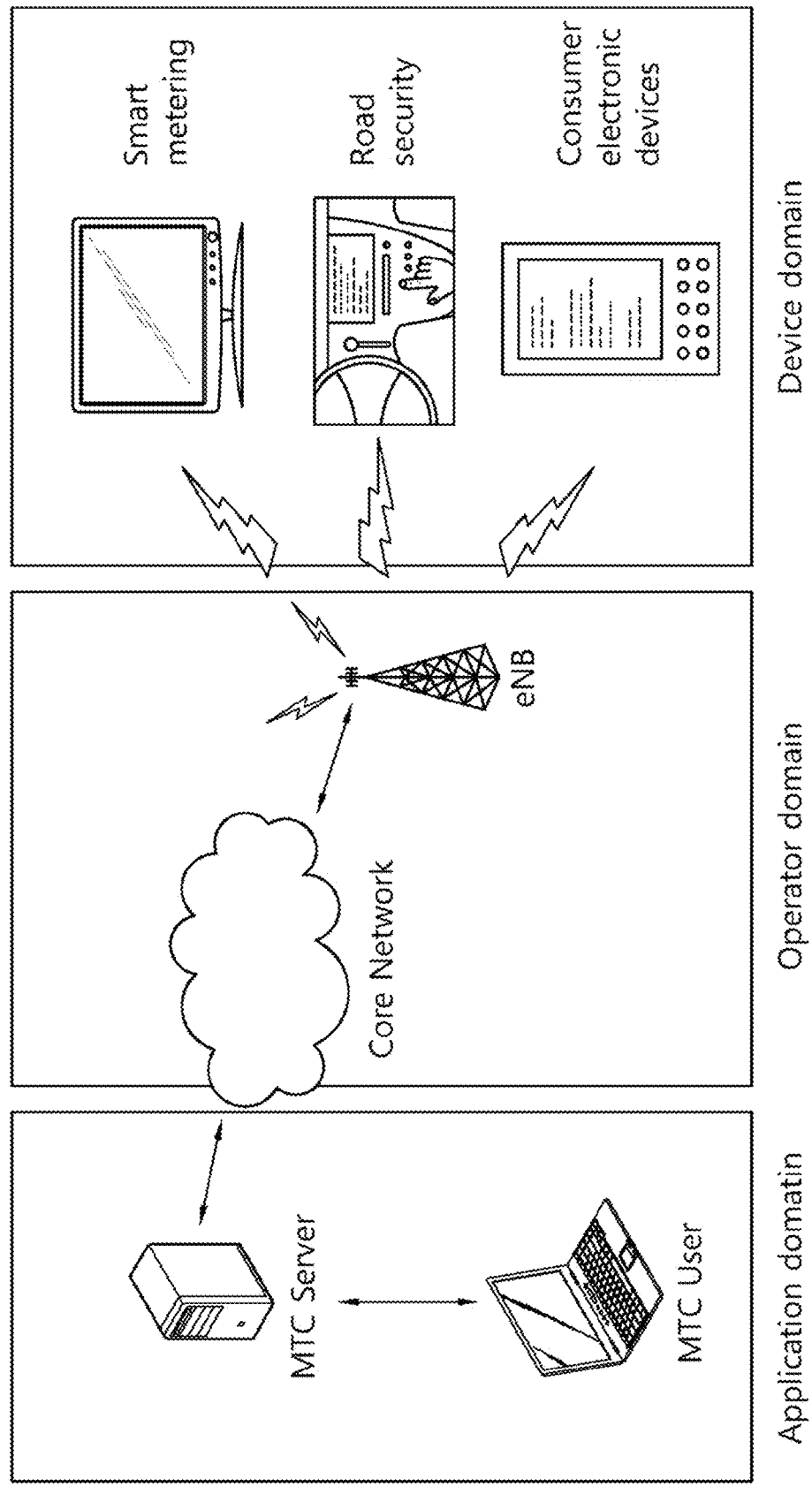
FIG. 8 shows an example of a service via an MTC device.

More specifically, referring to FIG. 9, a Services Capability Server (SCS) 620 transmits a monitoring action request message to an MTC-IWF 610. The monitoring action request may include event-related data to be monitored (also called event monitoring data). The event monitoring data may include an action type field for configuring, activating, deactivating, or triggering a report delivery regarding a specific monitoring event. In addition, the event monitoring data may further include a monitoring event ID and related parameter, a monitoring event priority, a monitoring destination node, etc. Herein, the MTC-IWF 610 as a device for performing an MTC interworking function is connected to the MMC 510 through a T5b interface as shown in FIG. 7, and is connected to the SCS 620 through a Tsp interface.

2~3) Upon reception of the request, the MTC-IWF 610 authenticates whether the SCS 620 has a right for the request, and confirms whether the request of the SCS 620 exceeds a predetermined allocation reference. If the confirmation result shows that the request of the SCS 620 is inappropriate, the MTC-IWF 610 transmits to the SBS 620 a monitoring action response including a cause value indicating a failure cause of the request. Otherwise, if the confirmation result shows that the request of the SCS 620 is appropriate, the MTC-IWF 610 transmits to the SCS 620 a monitoring action response including a value indicating a success of the request.

4) Subsequently, the MTC-IWF 610 transmits a subscriber information request message to a Home Subscription Server (HSS) 540 to confirm a monitoring configuration detail, e.g., a monitoring event ID. Herein, the monitoring event may be stored in the HSS/HLR 540 as the subscriber information.

5) The HSS/HLR 540 verifies the monitoring event information, and authenticates whether an MTC-IWF which attempts to configure a network node for the monitoring is appropriate. In addition, the HSS/HLR 540 delivers to the MTC-IWF 10 the subscriber information including the monitoring event related information.

6-7) The MTC-IWF 610 determines the network node for performing the monitoring, on the basis of information received from the SCS 620 and the HSS/HLR 540. If the network node for performing the monitoring is determined as the MME/SGSN 510, the MTC-IWF 610 transmits to the MME/SGSN 510 a request including monitoring event data.

8) Upon reception of the request including the monitoring event data, the MME/SGSN 510 is configured to monitor the event.

Meanwhile, although the configured event may be monitored by the MME/SGSN 510, it may also be monitored by the (e)NodeB 200 and/or the P-GW 530 according to a situation.

9~10) If the event is detected and collected through monitoring performed by the MME/SGSN 510, a report for the collected event data may be transmitted to the MTC-IWF 610.

11~13) The MTC-IWF 610 confirms whether a user who will receive the report is recorded in the subscription information.

If the information is not included in the report received from the MME/SGSN 510, an inquiry request of the SCS 620 or the application server is transmitted to the HSS/HLR 540. Upon reception of an inquiry result from the HSS/HLR 540, a report for an MTC event is transmitted to the SCS 620 or application server which has confirmed the inquiry.

The method of performing the MTC-related monitoring by the network node has been described above.

Hereinafter, an example for a network congestion or overload state and a solution thereof will be described.

Figure 10:
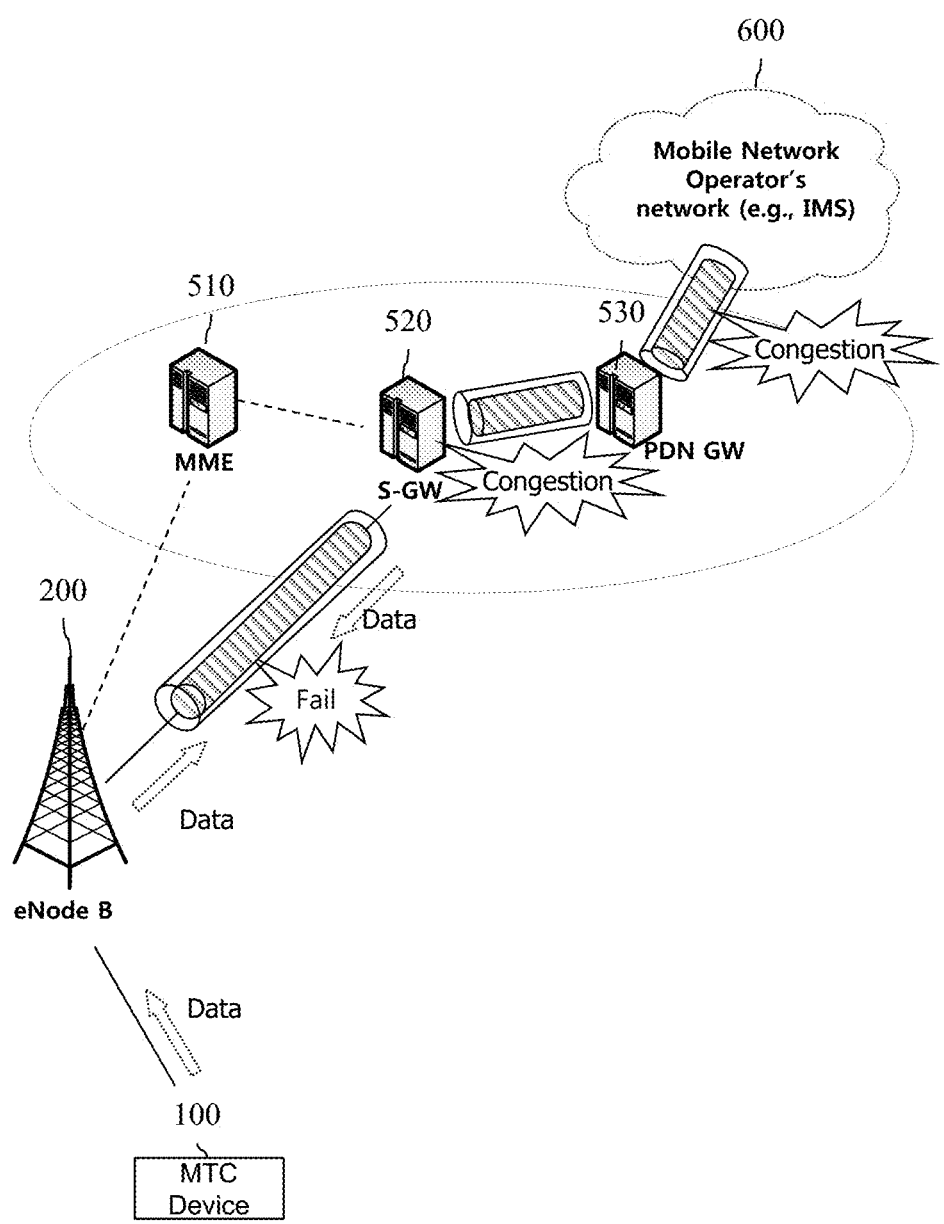
FIG. 10 shows a network overload state.

FIG. 10 shows a network overload state.

As shown in FIG. 10, if traffic is overloaded or congested in an interface between the eNodeB 200 and the S-GW 520, downlink data to the MTC device 100 or uplink data from the MTC device 100 is not correctly transmitted and thus fails in transmission.

Alternatively, even if an interface between the S-GW 520 and the PDN-GW 530 or an interface between the PDN-GW 530 and an Internet Protocol (IP) service network of a mobile communication operator is overloaded or congested, downlink data to the MTC device 100 or uplink data from the MTC device 100 is not correctly transmitted and thus fails in transmission.

Hereinafter, it is described a method of controlling a case where an overload/congestion including the aforementioned overload or congestion occurs in a network.

Congestion Control

When a network congestion occurs in a 3GPP MCT network, a core network node (MME, SGSN) performs NAS level congestion control to avoid or control signaling congestion and APN congestion.

The NAS level congestion control consists of an APN based congestion control and a general NAS level mobility management control.

The APN based congestion control implies an EMM, GMM, and (E)SM signaling related to a UE/MS and a specific APN (i.e., an SP related to a congestion state), and includes an APN based session management congestion control and an APN based mobility management congestion control.

On the other hand, the general NAS level mobility management control implies that a core network node (MME, SGSN) rejects a mobility management signaling request which is requested by the UE/MS in a general network congestion or overload situation to avoid the congestion and the overload.

In general, if the core network performs the NAS level congestion control, a back-off timer value is transmitted to the MTC device 100 by being carried on a rejection message. The MTC device 100 does not request EMM/GMM/(E)SM signaling to the network until the back-off timer expires.

The back-off timer may be classified into a Mobility Management (MM) back-off timer for controlling EMM/GMM signaling (e.g., attach, TAU/RAU request, etc.) and a Session Management (SM) back-off timer for controlling (E)SM signaling (e.g. PDN connectivity, Bearer Resource Allocation, Bearer Modification, PDP Context Activation, PDP Context Modification request, etc.). The MM back-off timer operates independently of each UE (i.e., device), and the SM back-off timer operates independently of each APN and each UE (i.e., device).

In addition, the (e)NodeB may also perform the congestion control. In an RAN or core network congestion situation, the UE/MS may receive a reject response from the (e)NodeB together with an extended wait timer when performing the RRC/RR(C) connection establishment procedure. In this case, the UE/MS cannot start the EMM/GMM procedure until the extended wait timer received from the (e)NodeB expires (therefore, the RRC/RR(C) connection establishment procedure cannot start). The aforementioned extended wait timer is considered as an MM back-off timer when it is used by the UE/MS.

In summary, the MM back-off timer is a mobility management related back-off timer used to control a case where a network congestion occurs, and is a timer which prevents the MMC device 100 from performing an attach, location information update (TAU, RAU), and service request procedure during the timer is running. However, exceptionally in case of an emergency bearer service and a Multimedia Priority Service (MPS), the MTC device 100 may be allowed to perform the request even if the timer is running.

As described above, the UE/MS may receive the MM back-off timer value from a core network node (e.g., MME, SGSN, etc.) or from a lower layer access stratum. In addition, the timer value may be randomly set by the UE/MS within the range of 15 minutes to 30 minutes.

Meanwhile, the SM back-off timer is a session management related back-off timer used to control a case where a network congestion occurs, and is a timer which prevents the MMC device 100 from configuring or changing an associated APN-based session. However, likewise, exceptionally in case of an emergency bearer service and a Multimedia Priority Service (MPS), the UE (device) may be allowed to perform the request even if the timer is running.

The UE/MS receives the SM back-off timer value from the core network node (e.g., MME, SGSN, etc.), and is randomly set within up to 72 hours. In addition, the timer value may be randomly set by the UE/MS within the range of 15 minutes to 30 minutes.

Meanwhile, if the MM/SM back-off timer value is provided from the network as described above, a network operator sets a corresponding back-off timer value, and each of the MM/SM back-off timer values is set in the range of several minutes to several hours according to a network situation and policy. The standard document 3GPP TS 23.401, TS 23.060, TS 24.301, TS 24.008, TS 36.331, TS 25.331 may be incorporated by reference for details of the NAS level congestion control and the MM/SM back-off timer.

FIG. 11 shows a procedure of rejecting an MM action or SM action of an MTC device in case of a network congestion or overload.

Figure 11A:
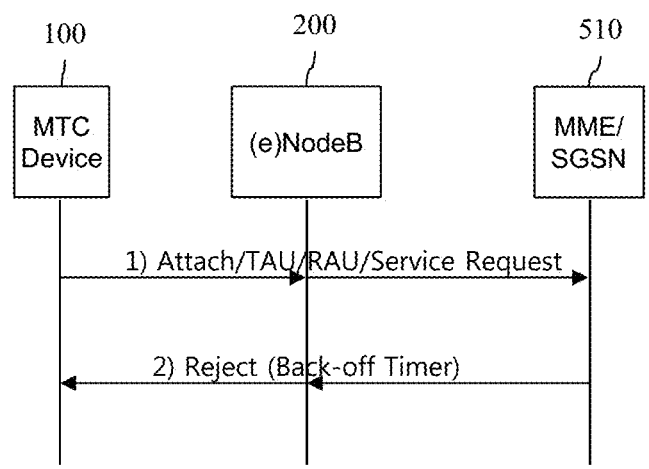
FIG. 11 shows a procedure of rejecting a Mobility Management (MM) action or Session Management (SM) action of an MTC device in case of a network congestion or overload.

Referring to FIG. 11(a), if the MTC device 100 performs the attach, TAU (Tracking Area Update) procedure, RAU (Routing Area Update), or service request procedure in the network congestion or overload case, the network node, for example, the MME/SGSN 510, transmits a reject message for the attach request, TAU request, RAU request, and service request according to a network situation such as an operator policy or the like.

In addition, while transmitting the reject message, the MME/SGSN 510 may transmit it by including a back-off timer into the reject message, so that the MTC device 100 does not reattempt an access until a duration thereof expires.

Figure 11B:
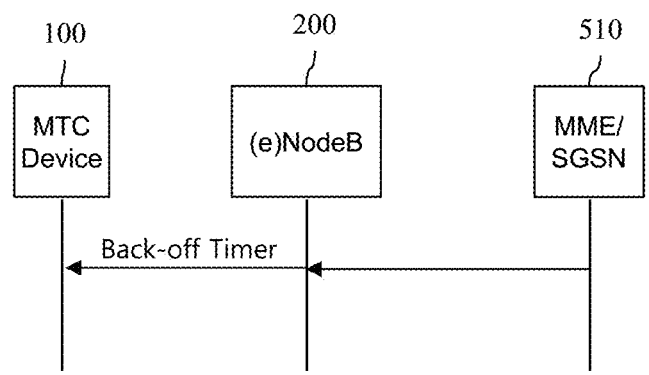

Alternatively, as shown in FIG. 11(b), the network node, e.g., the MME/SGSN 510, may deliver a back-off timer to the MTC device 100 via the (e)NodeB 200 in the network congestion or overload case according to a network situation such as an operator policy. The back-off timer may be included when the MME/SGSN 510 transmits a message (e.g., Deactivate EPS Bearer Context request, Deactivate PDP context request) transmitted to the MTC device 100.

Meanwhile, if the reject message is a TAU reject message, information of Table 3 below may be included.

TABLE 3

| Information | Description |
| --- | --- |
| Protocol discriminator | A discriminator for discriminating a protocol |
| Security header type | A type of a header used for security |
| TAU reject message ID | A message identifier |
| EMM cause | Indicate a reject cause |
| T3346 value | A back-off timer (MM back-off timer) |

Meanwhile, if the message is a Deactivate EPS Bearer Context request message, information of Table 4 below may be included.

TABLE 4

| Information | Description |
| --- | --- |
| Protocol discriminator | A discriminator for discriminating a protocol |
| EPS bearer ID | An EPS bearer identifier |
| Procedure transaction ID | A procedure transaction identifier |
| Deactivate EPS bearer context request message ID | A message identifier |
| ESM cause | Indicate a reject cause |
| Protocol configuration options | Protocol related information |
| T3396 value | A back-off timer (SM back-off timer) |

Meanwhile, the eNodeB 200 may also perform the congestion control. For example, regarding the RRC connection request, the eNodeB 200 may perform the congestion control by operating as shown in FIG. 12.

Figure 12:
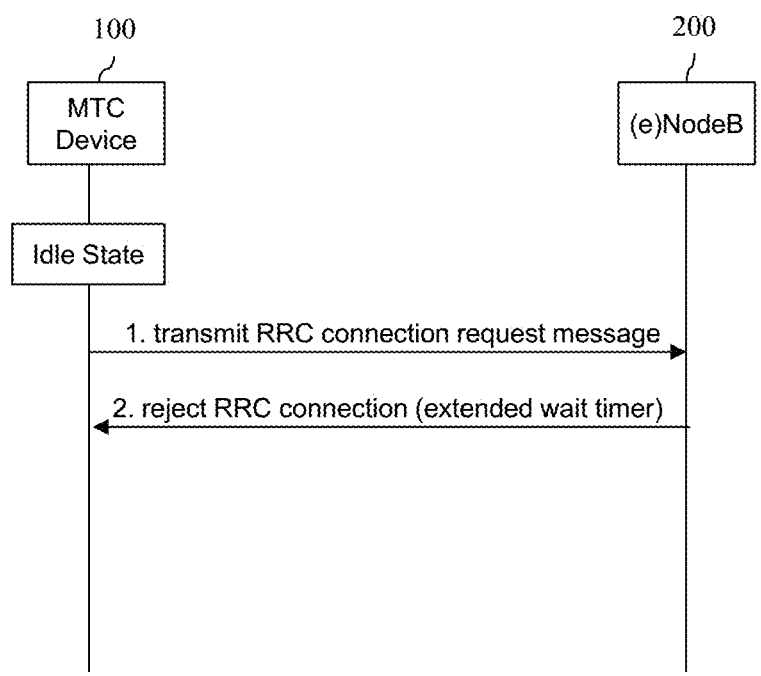
FIG. 12 shows an example of rejecting an RRC connection.

FIG. 12 shows an example of rejecting an RRC connection.

Referring to FIG. 12, if it is intended to establish an RRC connection to attempt data transmission, the MTC device 100 in an idle state transmits an RRC connection request message to the eNodeB 200.

In this case, if the eNodeB 200 is in an overload state, the eNodeB 200 transmits an RRC connection request message to the MTC device 100. The RRC connection reject message may include a back-off timer, e.g., an extended wait timer. The back-off timer, e.g., the extended wait timer, indicates a wait time in seconds for a delay tolerant access request. The extended wait timer may be designated to up to 1800 seconds (i.e., 30 minutes).

As described above, the MTC device 100 is often configured to operate with a low priority. When the MTC device 100 performs an RRC/RR(C) connection establishment procedure in a network congestion situation, a reject response may be received from an (e)NodeB together with a back-off timer, e.g., an extended wait timer. In addition, the MTC device 100 configured to operate with the low priority may receive the reject response from a network (MME or SGSN) together with a back-off timer (e.g., MM back-off timer or SM back-off timer) when performing an EMM and ESM/GMM and SM procedure. In this case, a UE may not be able to perform the EMM and ESM procedure or the GMM and SM procedure until the back-off timer (MM back-off timer or SM back-off timer) or the extended wait timer expires. Since the UE cannot transmit a NAS message to the network, if the UE is in an idle state, it may lead to a result in that an RRC/RR(C) connection establishment procedure cannot start.

Meanwhile, although it is shown in FIG. 9 that the network node performs MTC-related monitoring, it is also possible that the MTC 100 performs the MTC monitoring and reports a result thereof. However, if the MTC device 100 is configured to operate with the low priority as described above, and the back-off timer, e.g., the extended wait timer, is running, there is a problem in that the result cannot be reported. That is, a delay occurs until an abnormal situation generated in the MTC device 100 is recognized, and it is difficult to properly perform an appropriate measurement thereon.

Accordingly, hereinafter, a method in which the MTC device 100 performs MTC-related monitoring and correctly reports a result thereof to a network is described.

Figure 13:
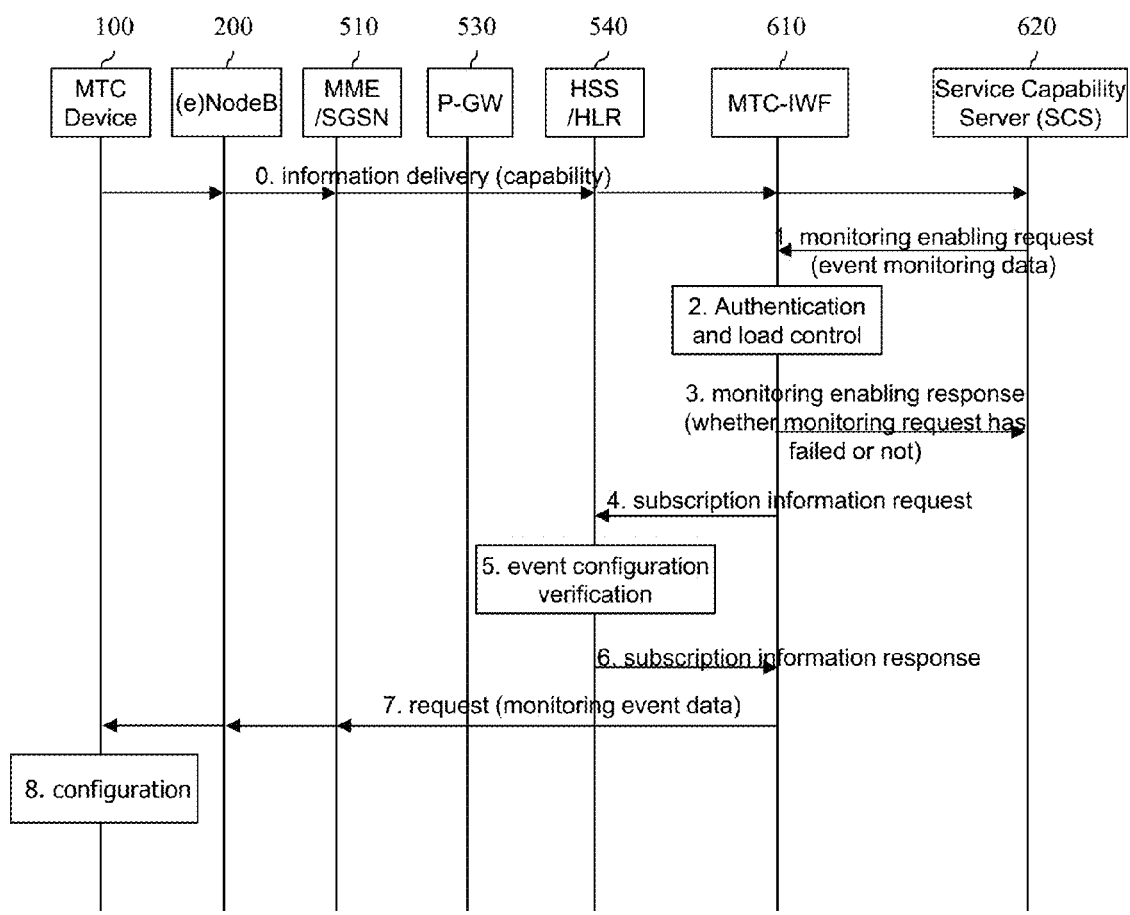
FIG. 13 is a signal flow diagram showing a process of performing monitoring by an MTC device according to an embodiment proposed in the present specification.
Figure 14:
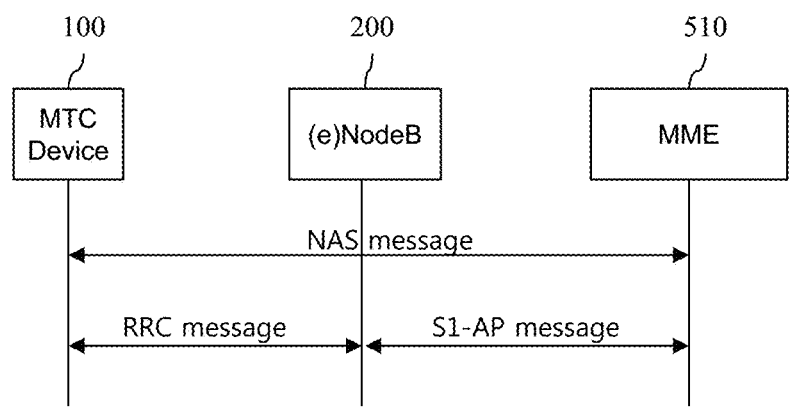
FIG. 14 shows an example of an interface and protocol shown in FIG. 13.

FIG. 13 is a signal flow diagram showing a process of performing monitoring by an MTC device according to an embodiment proposed in the present specification. FIG. 14 shows an example of an interface and protocol shown in FIG. 13.

Before referring to FIG. 13, as shown in FIG. 14, messages transmitted/received between the MTC device 100 and the (e)NodeB 200 are messages based on an RRC (Radio Resource Control) protocol. The messages transmitted/received between the (e)NodeB 200 and the MME/SGSN 510 are messages based on an S1-AP (S1 Application Protocol). Further, the messages transmitted/received between the MTC device 100 and the MME/SGSN 510 are messages based on a NAS (Non-Access stratum) protocol. The messages based on the NAS protocol are transmitted by being capsulated respectively to the RRC protocol-based messages and the S1-AP messages.

Since most of steps of FIG. 13 are similar to steps of FIG. 9, redundant descriptions will be omitted and only different steps will be described. The steps different from the steps of FIG. 9 will be first mentioned in brief as follows.

The MTC monitoring method proposed in the present invention may be implemented by combining one or more actions described below.

First, the MTC device 100 may report to a network node one or more of MTC monitoring related capability information and information regarding whether MTC monitoring is enabled. Accordingly, if there is one or more of an RRC connection request, an attach request, a TAU request, and an RAU request by the MTC device 100, the network node may not reject but accept the request. In this case, even if the aforementioned back-off timer or extended wait timer is running, the MTC device 100 may transmit the connection request, and the network node may also accept this.

Second, the network node may transmit MTC monitoring event related information to the MTC device 100 so that the MTC device 100 performs monitoring on the basis of the MTC monitoring event related information. In addition, if the MTC device 100 requests one or more of an RRC connection request, an attach request, a TAU request, and an RAU request to transmit a report based on the monitoring result, the (e)NodeB 200 or the MME/SGSN 510 shall not reject but accept the request. In this case, even if the aforementioned back-off timer or the extended wait timer is running, the MTC device 100 may transmit the connection request, and the network node may also accept this.

Hereinafter, each step will be described with reference to the accompanying drawings. For the MTC monitoring method proposed in the present invention, only some of the following steps may be required, or a combination of the steps may be performed by being divided into several phases.

The MTC device 100 may transmit one or more of capability information indicating whether the MTC device 100 can perform MTC monitoring and enable information indicating whether the MTC monitoring is enabled or disabled to one or more of the MME/SGSN 510, the HSS/HLR 540, the MTC-IWF 610, and the SCS 620 via the (e)NodeB 200.

The capability information may include one or more items in the following table. However, the capability information is not limited to the items in the following table. That is, in addition to the items of the following table, the MTC device may deliver several pieces of capability information implicitly.

TABLE 5

Monitoring event detection capability
When a monitoring event is detected, capability of reporting it to a network
When the monitoring event is detected, capability of performing an action based thereon
Information on a type or class of a detectable event
When the event is detected, information on a type or class of an action executable based thereon One or more of the items shown in the above table may be enabled or disabled. Enable information delivered from the MTC device 100 may include an enabled item. Alternatively, the enable information delivered from the MTC device 100 may include only information on a disabled item. Or, the enable information delivered from the MTC device 100 may include information on both of the enabled item and the disabled item.

Meanwhile, a method of delivering the capability information and the enable information by the MTC device 100 may use the existing mobility management procedure (e.g., an attach procedure, an RAU procedure, or a TAU procedure, etc.), a session management procedure (e.g., a PDN connection procedure, a bearer resource allocation procedure, a PDP context activation procedure, etc.), and various handover procedures, and may use other existing procedures for interacting with a network. Alternatively, a message procedure newly defined for the present invention may be used.

Meanwhile, a target to which the capability information and the enable information are delivered form the MTC device 100 may be an MSC, a P-GW, a GGSN, a PCRF, an AAA server, an ANDSF (Access Network Discovery and Selection Function) server, an MTC server, a server for MTC monitoring, or the like, in addition to the aforementioned MME/SGSN 510, the HSS/HLR 540, the MTC-IWF 610, and the SCS 620. The category of the aforementioned various network nodes is applicable to all elements expressed as a network or a network node throughout the present invention.

On the other hand, if the capability information and the enable information are stored in the HSS/HLR 540, the MME/SGSN 510, the MTC-IWF 610, the server function server 620, and various network nodes may acquire the capability information and the enable information from the HSS/HLR 540. That is, the information may be acquired from a database, similarly to subscriber information. Alternatively, some parts of the information may be acquired from the MTC device, and some parts of the information may be acquired from the database included in the network.

1~5) These steps conform to the steps 1~5 of FIG. 9, and thus the descriptions thereof will not be repeated.

6~7) The MTC-IWF 610 determines the MTC device as an entity for performing the monitoring, on the basis of information received from the SCS 620 and the HSS/HLR 540. Further, the MTC-IWF 610 transmits a monitoring request to the MTC device 100 via the MME/SGSN 510. The monitoring request may include monitoring event data.

The monitoring event data related information may include one or more of items of the following table. However, the information is not limited thereto, and thus may include various items. Further, a variety of information conventionally provided by the network to the MTC device may also be included.

TABLE 6

Information related to a monitoring event to be detected and reference information for deciding the event detection A usable (applicable) MTC Feature and/or a non-usable (non-applicable) MTC Feature(s)
Association between an MTC device and a UICC
Loss of connectivity
Communication failure events and reasons
An allowed location and/or a restricted location (geographical position and/or point of network access/attach) of the MTC device
Information on an action or task to be performed when detecting an event Perform a report to a network
Perform the action or the task
Perform additionally an action of the network in addition to the report to the network The items of the information related to the monitoring event to be detected and the reference information for deciding the event detection in the above table will be described in detail as follows.

Regarding the MTC feature, the MTC device 100 may decide that the event is detected when an MTC feature other than the usable (applicable) MTC feature is used (applied) and/or when the non-usable (non-applicable) MTC feature is used (applied).

In addition, regarding the association between the MTC device and the UICC in the above table, the MTC device 100 may decide that the monitoring event is detected when the association between the MTC device and the UICC is changed.

In addition, regarding the loss of connectivity in the above table, the MTC device 100 may decide that the event is detected when a connectivity to the network is lost.

In addition, regarding the communication failure events and reasons (e.g., a connectivity error code), the MTC device 100 may decide that the event is detected when a communication failure occurs with the network.

In addition, regarding the allowed location and/or restricted location of the MTC device, the MTC device 100 may decide that the event is detected when the MTC device 100 moves away from the allocated location or is at the restricted location. Herein, the location information may be managed with various granularities. For example, the location information may be implemented in unit of a cell, a location area, a tracking area, a routing area, a PLMN, an area configured with an actual longitude/latitude, a serving node capable or incapable of a location registration, an (e)NodeB capable or incapable of a camp-on operation, etc. For example, when transmitting an Attach Accept message in response to an Attach Request received from the MTC device 100, the MME 510 may transmit it by generating a list including tracking areas allowed to the MTC device 100. Alternatively, in addition to a TAI list (referred to as a TAI list 1) which is transmitted by being included in the Attach Accept message, the MME 510 may generate a TAI list (referred to as a TAI list 2) regarding tracking areas allowed to the MTC device 100 and may insert it to the Attach Accept message.

Meanwhile, information (e.g., an application ID) regarding an MTC application associated for each event to be detected or for each group and/or information regarding an associated Services Capability Server (SCS) and/or associated application server information, or the like may be further included in the information related to the monitoring event to be detected and the reference information for deciding the event detection.

On the other hand, the item for performing the action or task in the above table may additionally further include detailed information. For example, the above item may include one or more of information of an action or task to be performed internally by the MTC device, information of a time for performing the action or task, information for a time allowed to perform the action or task (e.g., information such as a timer), and the like. For another example, the item may include information regarding an action or task for providing the application of the MTC device with an action or task which cannot be performed afterwards (e.g., a handover request, a bearer resource allocation request procedure, etc.), an action or task for deleting primary information in the MTC device, and an action or task for providing the information related to the detected event to an application layer of the MTC device.

The information regarding the action or task may be configured for each event to be detected or for each event in a group unit.

In the above table, in addition to the report to the network, the item for the action to be performed with the network may additionally include detailed information. For example, in addition to the information regarding the action to be performed with the network, the item may further include information regarding a time for performing the action with the network, information regarding a time allowed to perform the action with the network (e.g., information such as a timer), or the like. Herein, the action with the network may imply, for example, a PDN disconnect procedure, a PDP context deactivation procedure, a detach procedure, or the like.

On the other hand, regarding the item for performing the report to the network, the item may additionally further include detailed information. For example, the item for performing the report to the network may include one or more of information regarding a network node and/or a server for which the report is made, a mechanism used in the report (e.g., in case of using a NAS message, which type of NAS message will be used, whether to report it in an SMS form, whether to report it in a priority alarm form, whether to report it in an emergency call form, or the like), an additional instruction related to the mechanism (e.g., in case of an MTC device operating with a low priority, whether to modify it to a normal device (or a normal UE/device), whether to operate it in the normal device, or whether to override the low priority, or the like), information included in a report message, information regarding a time for performing the report, and information regarding a time allowed for the report (e.g., information such as a timer).

One or more of items shown in the following table may be used as the information included in the report message.

TABLE 7 a type of a detected monitoring event
A time of detecting the event
SCS and/or application information related to the detected event
MTC application information (application ID) related to the detected event
Additional various information related to the detected event
An indicator for reporting that a report message is obtained by the event detection In a case where the report message of Table 7 is the indicator for reporting that the report message is obtained by the event detection, if the report message is the NAS message and if a NAS signaling connection needs to be configured to transmit the NAS message to a network, the indicator may be included not only in the NAS message but also in the RRC message (e.g., the RRC connection request message).

The information included in the report message is not limited to the items listed in the table. As long as it is valid when it is reported to the network and/or the MTC server and/or the MTC user, all information may be included. In addition, if it is included in the existing message, a new information element may be defined and included, and a new value may be defined and included in the exiting information element. A value used for a similar purpose may be used among values used in the existing information element.

Meanwhile, the aforementioned time information for performing the report, time information for performing the action or task, and time information for performing the action with the network may be configured in various forms. For example, the time information may be set to 'immediately after detecting the event', 'within a specific time after the detection (e.g., within 5 minutes, etc.)', 'when the MTC device can perform an action', etc. In addition, the time information may include information indicating whether the action 'shall', or 'should', or 'may' be performed by the decision of the MTC device.

Meanwhile, the aforementioned time information (i.e., the information regarding the time for performing the report, the information regarding the time allowed for the report, the information regarding the time for performing the action or task, the information regarding the time allowed to perform the action or task, the information regarding the time for performing the action with the network, and the information regarding the time allowed to perform the action with the network) may be provided individually or may be provided in an integral manner.

On the other hand, the monitoring event related information of Table 6 may be delivered in advance to the MTC device 100 in response to the capability information and/or enable information received from the MTC device 100 in the step 0) shown in FIG. 14.

A network node for transmitting the monitoring event related information to the MTC device 100 may store the information in advance and then transmit the information, or may acquire the information from a different network node(s) and thereafter transmit the information. Alternatively, some parts of the information may be stored in the network node, and some parts thereof may be acquired from the different node(s) and thereafter may be delivered. The acquiring of the information may be performed in association with a part of a process of delivering the capability information and/or the enable information by the MTC device 100 in the step 0) shown in FIG. 13. For example, when the MME/SGSN 510 which receives an Attach Request from the MTC device 100 performs an Update Location procedure to the HSS/HLR 540, the information may be acquired from the HSS/HLR 540 together with or independently of subscriber information related to the MTC device 100. The Attach Request message may include one or more of the MTC monitoring related capability information and MTC monitoring enable related information of the MTC device 100. The MMS/SGSN 510 which acquires the monitoring event related information regarding the MTC device from the HSS/HLR 540 may insert the monitoring event related information to an Attach Accept message to be transmitted to the MTC device 100.

Meanwhile, if there is a need to update the monitoring event related information delivered to the MTC device 100, the network node may update/modify the information through an interaction with the MTC device.

In addition to the aforementioned method, the MTC device may configure and/or acquire and/or store and/or update the monitoring event related information in various methods and forms. Further, the MTC device may have some parts of the information in advance, and may acquire some parts of the information from a network.

Now, returning to FIG. 13, the description is continued as follows.

8) Upon receiving a request including the monitoring event data, the MTC device 100 is configured to monitor the event.

Figure 15:
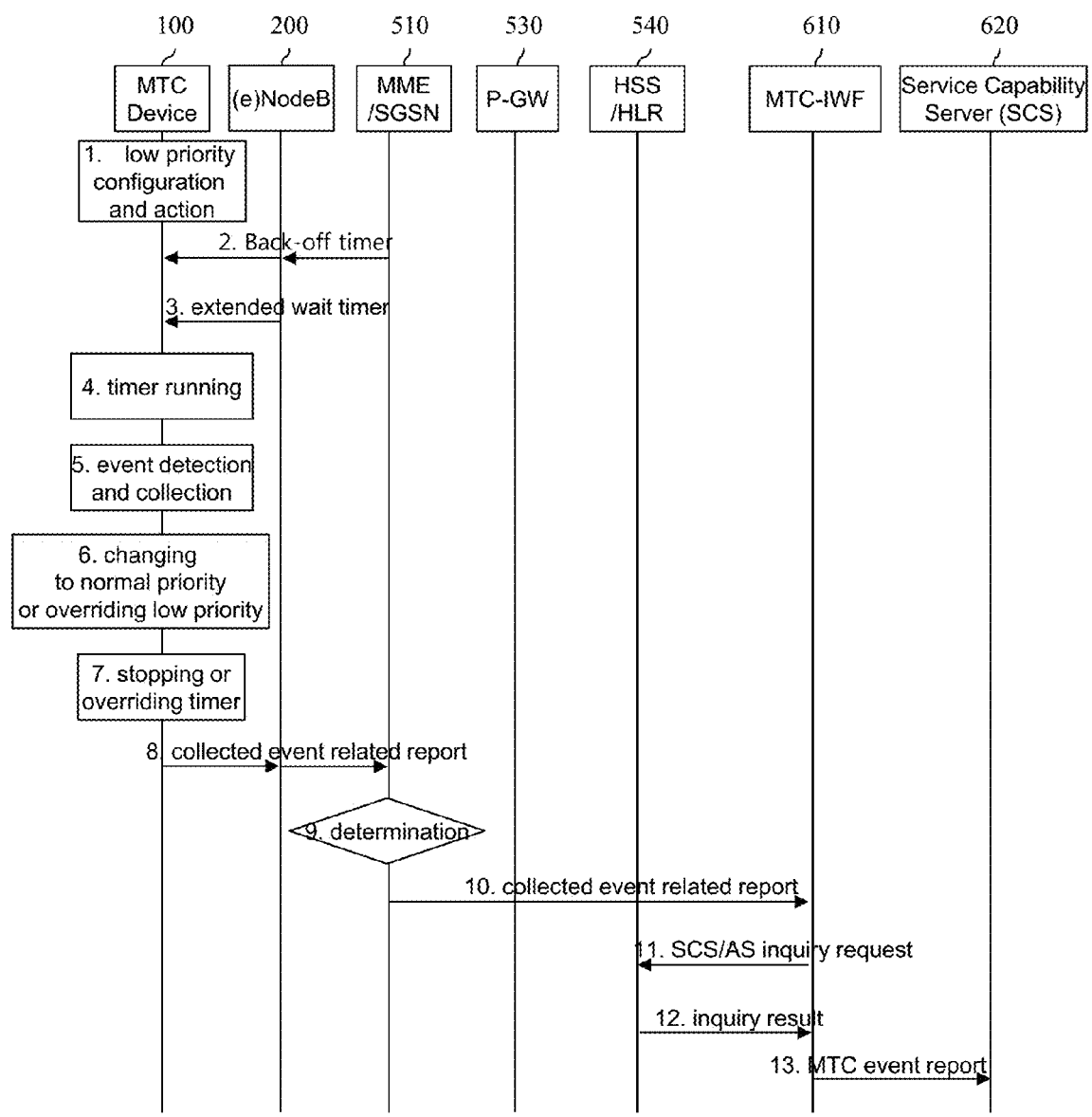
FIG. 15 is a flowchart showing a method of transmitting an MTC monitoring result when an MTC device cannot transmit a message to a network according to a network congestion or overload.

FIG. 15 is a flowchart showing a method of transmitting an MTC monitoring result when an MTC device cannot transmit a message to a network according to a network congestion or overload.

Each step is described as follows by referring to FIG. 15. It is assumed that an MTC device 100 has already acquire monitoring event related information as shown in Table 6 as described above with reference to FIG. 13.

The MTC monitoring method proposed in the present invention may be configured by combining one or more of the following steps.

1~4) The MTC device 100 is configured to support dual priorities or multiple priorities (i.e., the device is a dual-priority UE or a multi-priority UE), and operates with a low priority. Alternatively, the MTC device 100 supports only a low priority (i.e., the device is a low priority UE), and thus operates only with the low priority. In this case, as shown in FIG. 11 and FIG. 12, since the MTC device 100 operates with the low priority, by receiving one or more of a back-off timer, e.g., an MM back-off timer, an SM back-off timer, and an extended wait timer, a corresponding timer is running 5~7) In this case, if the MTC device 100 detects and collects the event through monitoring, in order to transmit a report for the collected event data, the MTC device 100 may operate with and/or may be changed to a normal priority (or a priority overriding the low priority or a priority higher than the low priority). Alternatively, even if the MTC device 100 is configured only with the low priority, the low priority may be overridden and a report for the collected event data may be transmitted to the network. In addition, if one or more of the back-off timer, e.g., the MM back-off timer, the SM back-off timer, and the extended wait timer are running, the MTC device 100 may stop or override the running timer.

In order to transmit the report as described above, the MTC device 100 may be configured to change from the low priority to the normal priority (or the priority overriding the low priority or the priority higher than the low priority) or to operate with the normal priority (or the priority overriding the low priority or the priority higher than the low priority) or to override the low priority. The configuration may be performed by the network node. For example, the configuration may be a configuration for acting as and/or changing to the normal UE to report the monitoring event to the low priority UE (e.g., configured to override the NAS signaling low priority indicator for MTC monitoring), or may be a configuration for acting as and/or changing to the normal UE to report the monitoring event to the dual-priority UE (e.g., configured to override the NAS signaling low priority indicator for MTC monitoring).

More specifically, if the MTC device 100 is configured to the low priority (i.e., if the device is the low priority UE) or is a dual-priority UE operating with the low priority, the MTC device 100 may additionally further perform one or more of the following actions to transmit the report.

When two priorities are supported (i.e., the device is the dual-priority UE), the MTC device 100 operates by changing the priority according to a typical action of changing the priority from the low priority to the normal priority. That is, as can be seen by referring to the documents 3GPP TS 24.008 and TS 24.301, a higher layer (e.g., an application layer) may instruct/request a NAS layer to change from the low priority to the normal priority (or the priority overriding the low priority or the priority higher than the low priority) or to operate with the normal priority (or the priority overriding the low priority or the priority higher than the low priority). When applying such an aspect to the present invention, if the MTC device 100 detects a monitoring related event, an MTC related application or an application layer or an AS layer of the UE may instruct/request the NAS layer to change from the low priority to the normal priority (or the priority overriding the low priority or the priority higher than the low priority) or to operate with the normal priority (or the priority overriding the low priority or the priority higher than the low priority) or to override the low priority. Alternatively, if the monitoring related event is detected in the NAS layer of the MTC device 100, it may be determined to change from the low priority to the normal priority (or the priority overriding the low priority or the priority higher than the low priority) or to operate with the normal priority (or the priority overriding the low priority or the priority higher than the low priority) or to override the low priority.

Even if the MTC device 100 is currently running a Mobility Management (MM) back-off timer (or T3346), in order to transmit an MM message including the report message, the running MM back-off timer may be stopped or overridden.

Even if the MTC device 100 is currently running a Session Management (SM) back-off timer (or T3396), in order to transmit the SM message including the report message or an MM message including the SM message to a network, the running SM back-off timer may be stopped or overridden.

8) Upon completion of the aforementioned actions, the MTC device 100 may transmit a report message regarding the collected event to the network, e.g., the MME/SGSN 510 and the MTC-IWF 610, via the (e)NodeB 200.

In this case, if the MTC device 100 transmits the report message by inserting it to the NAS message, a low priority indicator inserted to the NAS message may be configured to "MS is configured for NAS signaling low priority". Alternatively, the low priority indicator inserted to the NAS message may be configured to "MS is not configured for NAS signaling low priority". That is, the NAS message may not include an item related to the low priority.

Alternatively, if the MTC device 100 transmits the report message by inserting it to the RRC message or if the RRC connection request message needs to be transmitted to transmit the NAS message when the report message is included in the NAS message, low access priority information (or delayTolerantAccess related information) may be included (or configured) or may be not included (or not configured) in the RRC message.

Alternatively, if EAB (Extended Access Barring) is applied to the MTC device 100, when there is an RRC connection request from a NAS layer to an RRC layer, it may be reported not to perform the applying of EAB (or information for allowing the applying of the EAB is not included).

The concept of the additional actions described above may also be applied by extension to access class barring or the like. For example, even if the access class barring is applied to the MTC device 100, when there is a need to transmit the report message, it may be transmitted without having to apply the ACB.

Meanwhile, a head of a message such as an MM message, an SM message, a NAS message, and an RRC message (e.g., an Attach Request message, a TAU request message, an RAU request message, an RRC connection request message, a handover request message, a message for a service request (a service request or an extended service request), etc.) to which the report message is encapsulated and/or associated with the report message may explicitly or implicitly include an indicator or information for reporting that the message is related to the event detection and aims at reporting this. Alternatively, the message to which the report message is encapsulated may be a message dedicated for the report. Through the aforementioned mechanism, the MTC device can transmit the report message in various cases in which transmission to the network is barred (e.g., when it is not in an allowed location, when it is not an allowed access time, and when roaming is not allowed).

Referring back to FIG. 16, the description is continued as follows.

9) Even if the back-off timer, e.g., the MM back-off timer, the SM back-off timer, and the extended wait timer are running, when the report message is received, the MME/SGSN 510 decides whether to accept the message.

For the above decision, the MME/SGSN 510 considers an indicator or information included in the message and indicating that the message is for reporting the detected event. That is, the MME/SGSN 510 decides to accept the message on the basis of the indicator or information when it is recognized that the message is transmitted to report an event detected by the MTC device 100.

Meanwhile, even if the MTC device 100 operates with a low priority or a back-off timer (e.g., the MM back-off timer, the SM back-off timer, and the extended wait timer) is running, when the MME/SGSN 510 receives the report message, the MME/SGSN 510 decides whether to accept the message. In this case, the MME/SGSN 510 may decide to accept the message on the basis of the indicator or information when it is recognized that the message is transmitted to report an event detected by the MTC device 100.

Alternatively, even if the MTC device 100 operates with a low priority or a back-off timer (e.g., the MM back-off timer, the SM back-off timer, and the extended wait timer) is running, when the MME/SGSN 510 receives the report message, the MME/SGSN 510 decides whether to accept the message on the basis of capabilities information of the MTC device and/or enable/disable information and/or MTC monitoring related information configured in the MME/SGSN 510. For example, if the MTC device 100 has MTC monitoring related capabilities and is enabled, the MME/SGSN 510 reads the received message and confirms whether it contains an event report. If the confirmation result shows that the event report is contained, it is decided that the message is accepted. Alternatively, if the MME/SGSN 510 is configured to perform MTC monitoring for the MTC device 100, whether the event report is contained is confirmed by reading the received message. If the confirmation result shows that the event report is contained, it is decided that the message is accepted. Although the event report contained in the message may have a form of a typical NAS message (e.g., MM message or SM message) from a perspective of the MTC device 100, it is also possible to decide that the event is detected as a result of analysis on the basis of MTC monitoring event information configured in the MME/SGSN 510.

10~13) The MME/SGSN 510 delivers the report message to the MTC-IWF 610, and the MTC-IWF 610 confirms whether a report message has related information regarding who will receive the report. If the information is not included in the report received from the MME/SGSN 510, an inquiry request of the SCS 620 or the application server is transmitted to the HSS/HLR 540. Upon reception of the inquiry result from the HSS/HLR 540, a report for an MTC event is transmitted to the SCS 620 or application server for which the inquiry is configured. The MME/SGSN 510 may recognize that the message received from the MTC device is for reporting detected monitoring event related information, and thereafter may perform a measure suitable for the MTC device in regards to an action for reporting the MTC event to the SCS 620 or the application server and/or the reported monitoring event. Examples of the measurement suitable for the MTC device include various actions such as reducing a resource allocated to a UE, rejecting a handover, detaching the UE, etc.

In the aforementioned steps 1 to 4, it is described that the MTC device operates with a lower priority and is running a corresponding timer by receiving one or more of the back-off timer, e.g., the MM back-off timer, the SM back-off timer, and the extended wait timer. However, even if the MTC device does not operate with the low priority, the MME/SGSN can provide the back-off timer (e.g., the MM back-off timer, the SM back-off timer) to the MTC device for congestion control. Therefore, the MTC monitoring method proposed in the present invention is also applicable by using FIG. 15 to an MTC device operating irrespective of the low priority, or an MTC device operating normally, or an MTC device not operating with the low priority.

The content described up to now can be implemented in hardware. This will be described with reference to FIG. 16.

Figure 16:
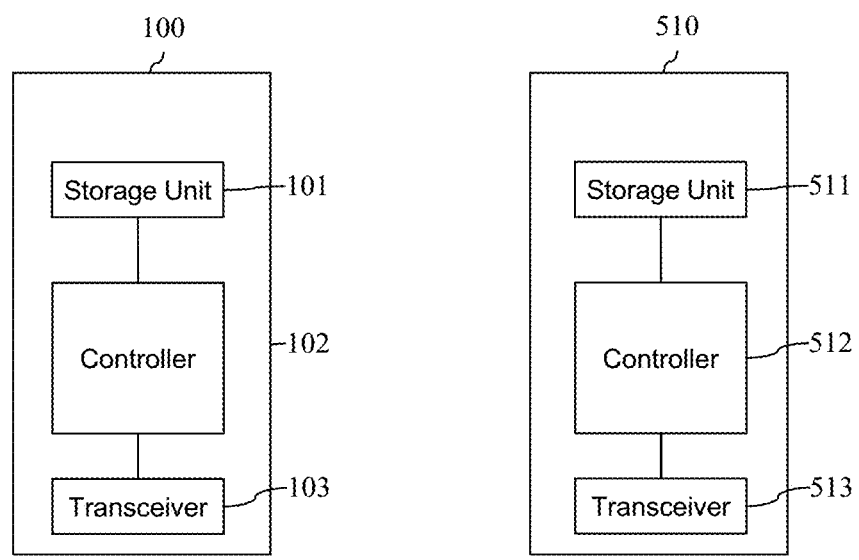
FIG. 16 is a block diagram showing a structure of an MTC device 100 and an MME/SGSN 510 according to an embodiment of the present invention.

FIG. 16 is a block diagram showing a structure of an MTC device 100 and an MME/SGSN 510 according to an embodiment of the present invention.

As shown in FIG. 16, the MTC device 100 includes a storage element 101, a controller 102, and a transceiver 103. Further, the MME/SGSN 510 includes a storage element 511, a controller 512, and a transceiver 513.

The storage elements 101 and 511 store the method of FIG. 9 to FIG. 15.

The controllers 102 and 512 control the storage elements 101 and 511 and the transceivers 103 and 513. More specifically, the controllers 102 and 512 respectively execute the aforementioned methods stored in the storage elements 101 and 511. Further, the controllers 102 and 512 transmit the aforementioned signals via the transceivers 103 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A machine type communication (MTC) monitoring method performed by a MTC device, the method comprising:

receiving a monitoring request including information for event detection from a network node;

detecting, an MTC device operating with a first priority, an MTC monitoring related event while running a back-off timer; and when the detected event needs to be reported, generating a report message containing a report on the detected event;

encapsulating the report message into a Non-Access Stratum (NAS) message including an indicator indicating to the network node that, because the report message is caused by the event detection configured by the network node, the report message should not be rejected;

encapsulating the NAS message into a radio resource control (RRC) message in which the indicator is also included; and transmitting the RRC message to the network node.

2. The method of claim 1, wherein the running back-off timer includes one or more of a mobility management (MM) back-off timer, a session management (SM) back-off timer, and an extended wait timer.

3. The method of claim 1, further comprising:

performing a change from the first priority to a second priority for the MTC device, before transmitting the report message.

4. The method of claim 3, wherein the first priority is a low priority, and the second priority is a normal priority or a priority overriding the low priority or a priority higher than the low priority.

5. The method of claim 1, wherein the report contains one or more of:

a type of a detected event;

a time at which the event is detected;

service capability server (SCS) and/or application information related to the detected event;

MTC application information related to the detected event; and additional information related to the detected event.

6. The method of claim 1, wherein in the detecting of the event, it is determined that the event is detected when the MTC device moves away from an allowed location or is at a restricted location.

7. The method of claim 6, wherein the location is expressed in any one of units of a cell, a location area, a tracking area, a routing area, a PLMN, an area configured with an actual longitude/latitude, a serving node capable of a location registration, a serving node incapable of a location registration, an (e)NodeB capable of a camp-on operation, and an (e)NodeB capable of a camp-on operation.

8. The method of claim 1, wherein the report message does not include information on the first priority.

9. The method of claim 1, wherein the network node is a mobility management entity (MME) or a serving GPRS support node (SGSN).

10. A machine type communication (MTC) monitoring method performed by a network node, the method comprising:

transmitting a monitoring request including information for event detection to an MTC device;

receiving a radio resource control (RRC) message from the MTC device which is operating with a first priority and is running a back-off timer, wherein the RRC message encapsulates a Non-Access Stratum (NAS) message, and the RRC message includes an indicator indicating that, because a report message containing a report on the detected event is caused by the event detection, the report message should not be rejected, and wherein the NAS message encapsulates the report message, and the NAS message also includes the indicator;

determining whether to accept the report message based on the indicator; and if the report message is accepted, delivering the report message to an MTC monitoring related server.

11. The method of claim 10, wherein the running back-off timer includes one or more of a mobility management (MM) back-off timer, a session management (SM) back-off timer, and an extended wait timer.

12. The method of claim 10, wherein the network node is a mobility management entity (MME) or a serving GPRS support node (SGSN).

13. The method of claim 10, wherein MTC monitoring related server is an MTC-InterWorking Function (MTC-IWF), a service capability server (SCS), or an application server.

* * * * *